(12) United States Patent
Wang et al.

(10) Patent No.: US 10,420,099 B2
(45) Date of Patent: Sep. 17, 2019

(54) METHOD AND ACCESS POINT OF DETERMINING GUARD PERIOD FOR DOWNLINK-TO-UPLINK SWITCHING

(71) Applicant: Telefonaktiebolaget LM Ericsson (publ), Stockholm (SE)

(72) Inventors: Jianfeng Wang, Beijing (CN); Huaisong Zhu, Beijing (CN); Shaohua Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/572,058

(22) PCT Filed: May 11, 2015

(86) PCT No.: PCT/CN2015/078655
§ 371 (c)(1),
(2) Date: Nov. 6, 2017

(87) PCT Pub. No.: WO2016/179777
PCT Pub. Date: Nov. 17, 2016

(65) Prior Publication Data
US 2018/0139752 A1    May 17, 2018

(51) Int. Cl.
*H04W 72/04* (2009.01)
*H04W 56/00* (2009.01)
(Continued)

(52) U.S. Cl.
CPC ...... *H04W 72/0446* (2013.01); *H04B 7/2643* (2013.01); *H04B 7/2671* (2013.01);
(Continued)

(58) Field of Classification Search
CPC .. H04B 7/2643; H04B 7/2671; H04B 7/2684; H04W 72/0446; H04W 56/005; H04W 56/0055; H04L 27/2602; H04L 5/14
See application file for complete search history.

(56) References Cited

U.S. PATENT DOCUMENTS

2009/0046604 A1    2/2009  Matsumoto et al.
2010/0111224 A1    5/2010  Lim et al.
(Continued)

FOREIGN PATENT DOCUMENTS

CN    101895326 A    11/2010
WO    2014108947 A1    7/2014

OTHER PUBLICATIONS

E. Lähetkangas, Kari Pajukoski, Gilberto Berardinelli, Fernando Tavares, Esa Tiirola, Ilkka Harjula, Preben Mogensen, Bernhard Raaf, On the Selection of Guard Period and Cyclic Prefix for Beyond 4G TDD Radio Access Network, Proceedings of the 2013 European Wireless Conference, pp. 1-5, Apr. 18, 2013 (Year: 2013).*
(Continued)

*Primary Examiner* — Christopher M Crutchfield
(74) *Attorney, Agent, or Firm* — Sage Patent Group (57) ABSTRACT

The embodiments disclose a method of determining guard period for downlink-to-uplink switching in an access point of a time division duplex radio communication network. For each of a plurality of terminal devices served by the access point, the method comprising obtaining measurement information on uplink transmission delay of the terminal device due to the downlink-to-uplink switching and propagation delay; determining a time length of a guard period with respect to the terminal device based on the measurement information; assigning a time period scheduled for transmitting a uplink subframe with the time length as the guard
(Continued)

period with respect to the terminal device; and informing the terminal device of the assignment.

12 Claims, 8 Drawing Sheets

(51) Int. Cl.
*H04W 24/08* (2009.01)
*H04L 27/26* (2006.01)
*H04B 7/26* (2006.01)
*H04L 5/14* (2006.01)
*H04L 5/00* (2006.01)

(52) U.S. Cl.
CPC ............ *H04B 7/2684* (2013.01); *H04L 5/14* (2013.01); *H04L 27/2602* (2013.01); *H04L 27/2607* (2013.01); *H04L 27/2666* (2013.01); *H04W 24/08* (2013.01); *H04W 56/003* (2013.01); *H04W 56/0005* (2013.01); *H04L 5/0051* (2013.01)

(56) References Cited

U.S. PATENT DOCUMENTS

| | | | | |
|---|---|---|---|---|
| 2013/0136041 | A1* | 5/2013 | Hoymann | H04W 24/02 370/280 |
| 2014/0207374 | A1* | 7/2014 | Taylor, Jr. | G01C 21/16 701/470 |
| 2015/0215107 | A1* | 7/2015 | Siomina | H04L 5/16 370/281 |
| 2015/0327196 | A1* | 11/2015 | Blankenship | H04W 56/0045 370/281 |
| 2016/0119840 | A1* | 4/2016 | Loehr | H04W 72/0446 370/331 |

OTHER PUBLICATIONS

Unknown, Author, "Maximum Timing Advance for TDD", TSG-RAN WG1 #52, R1-080889, Ericsson, Sorrento, Italy, Feb. 11-15, 2008, 2 pages.

* cited by examiner

METHOD AND ACCESS POINT OF DETERMINING GUARD PERIOD FOR DOWNLINK-TO-UPLINK SWITCHING

TECHNICAL FIELD

The present technology relates to the field of communication, particularly to a method in an access point (AP) for determining guard period for downlink-to-uplink switching in a time division duplex (TDD) radio communication network. The technology also relates to an AP and a computer readable storage medium for performing the method.

BACKGROUND

In the evolving time division duplex (TDD) radio communication network, the very high flexibility in downlink/uplink (DL/UL) assignment of subframes would be selected to follow the traffic variations, in which spectrum resources are dynamically assigned to either transmission direction, i.e. downlink or uplink. As such, it easily exploits unpaired spectrum allocations in the same carrier.

When switching from downlink transmission to uplink transmission, both the Evolved Node B (eNB) and the user equipment (UE) need time to complete the switching. In general, the UE needs more time than the eNB to finish the switching. Especially, a low-performance UE would have a longer switch time. In addition, the propagation delays are also different for the UEs served by the eNB due to the different distances from the eNB. Hence, a guard period (GP) is introduced between the downlink subframes and the uplink subframes to accommodate the switch time and the propagation delay. During the guard period, no payload data is transmitted from/to the eNB.

Figure 1:
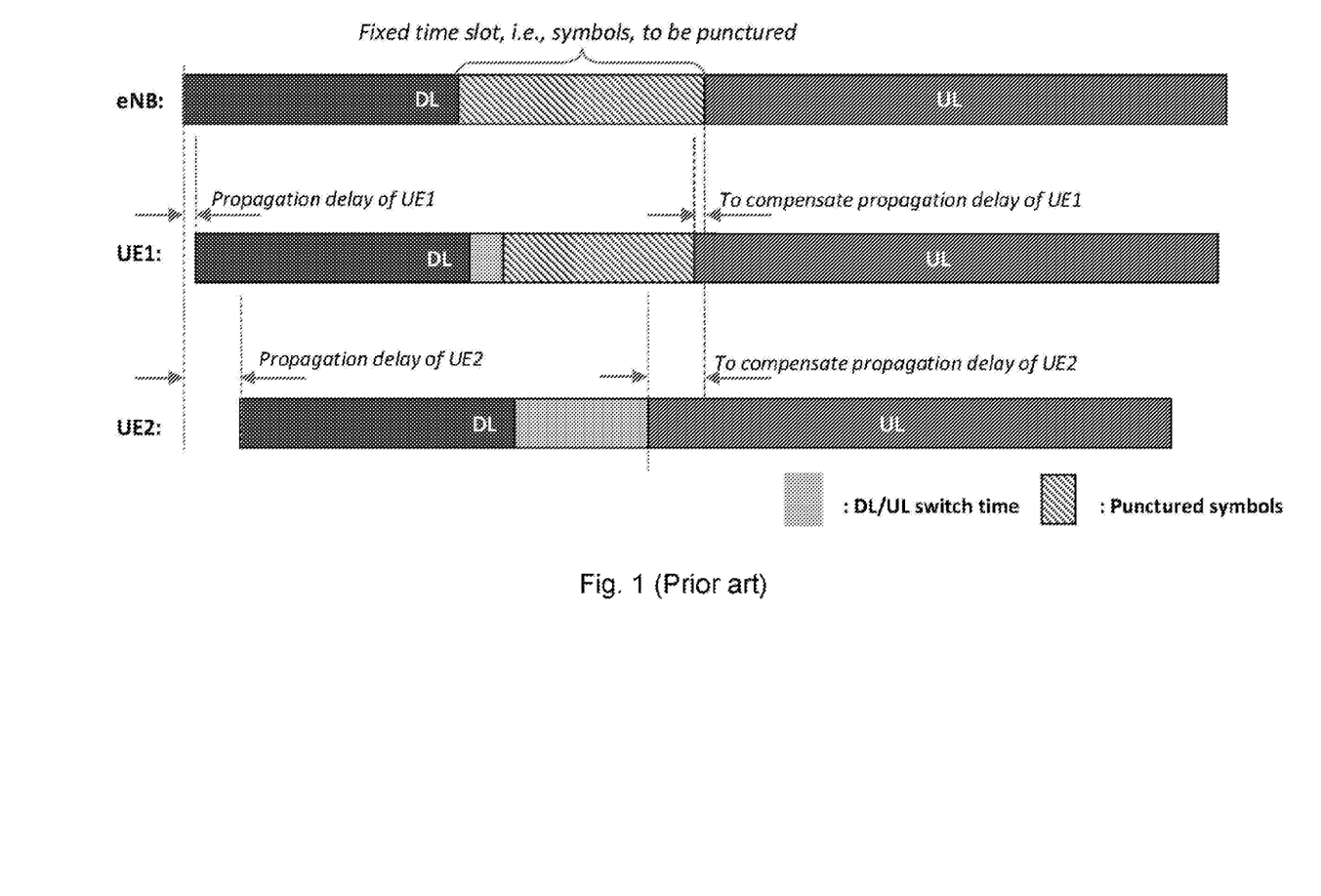
FIG. 1 illustrates a diagram of puncturing a fixed time slot in the downlink subframes as the guard period with respect to all the UEs served by the eNB.

Currently, the problem for the flexible duplex is that a fixed time slot needs to be pre-defined as the guard period for DL-to-UL switching in the downlink subframe. For example, two UEs are served in one cell as shown in FIG. 1. The UE1 is a high-performance terminal with a very short DL-to-UL switch time and small propagation delay, i.e., close to the eNB, whereas the UE2 is a low-performance terminal with a relative long DL-to-UL switch time and large propagation delay, i.e., far away to the eNB. To serve both UEs in the following uplink subframe, the eNB would puncture the symbols in downlink subframes to reserve a time period long enough to be larger than the maximum DL/UL switch time plus propagation delay as the guard period for the DL-to-UL switching. In this case, even if the UE1 has finished the DL-to-UL switching, it has to wait for extra time before transmitting uplink subframe to the eNB. As a result, the spectrum efficiency is impacted badly. This is especially the case when the disparity of the DL-to-UL switching time and propagation delay among the UEs is larger.

SUMMARY

It's an object of the present disclosure to resolve or alleviate at least one of the problems mentioned above.

A first aspect of the present disclosure relates to a method of determining guard period for downlink-to-uplink switching in an AP of a TDD radio communication network. For each of a plurality of terminal devices served by the AP, the method comprising obtaining measurement information on uplink transmission delay of the terminal device due to the downlink-to-uplink switching and propagation delay; determining a time length of a guard period with respect to the terminal device based on the measurement information; assigning a time period scheduled for transmitting a uplink subframe with the time length as the guard period with respect to the terminal device; and informing the terminal device of the assignment.

A second aspect of the present disclosure relates to a computer readable storage medium storing instructions which, when run on a AP, cause the AP to perform the steps of the method as described above.

A third aspect of the present disclosure relates to an AP configured to determine guard period for downlink-to-uplink switching in a TDD radio communication network. The AP comprises an obtaining unit, a determining unit, an assigning unit and an informing unit. The obtaining unit is adapted to obtain measurement information on uplink transmission delay of a terminal device served by the AP due to the downlink-to-uplink switching and propagation delay. The determining unit is adapted to determine a time length of a guard period with respect to the terminal device based on the measurement information. The assigning unit is adapted to assign a time period scheduled for transmitting a uplink subframe with the time length as the guard period with respect to the terminal device. The informing unit is adapted to inform the terminal device of the assignment.

Through puncturing the symbols on the uplink subframes, instead of downlink subframe, to reserve the corresponding time period as the guard period for DL-to-UL switching, the AP is enabled to set different guard periods for the UEs served by the AP respectively. In particular, a guard period with respect to a UE is determined based on the switch time and propagation delay of this UE without considering the switch time and propagation delays of other UEs. In this way, the AP can serve multiple kinds of terminal devices with different performances including both high-end terminal and low-end terminal and cover a wide serving area without sacrificing the spectrum efficiency significantly.

BRIEF DESCRIPTION OF THE DRAWINGS

The technology will be described, by way of example, based on embodiments with reference to the accompanying drawings, wherein.

DETAILED DESCRIPTION

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Although specific terms in some specifications are used here, such as AP, it should be understood that the embodiments are not limited to those specific terms but may be applied to all similar entities, such as base station, macro base station, femto base stations, Core Network (CN), NodeB, eNB etc.

Embodiments herein will be described below with reference to the drawings.

Figure 2:
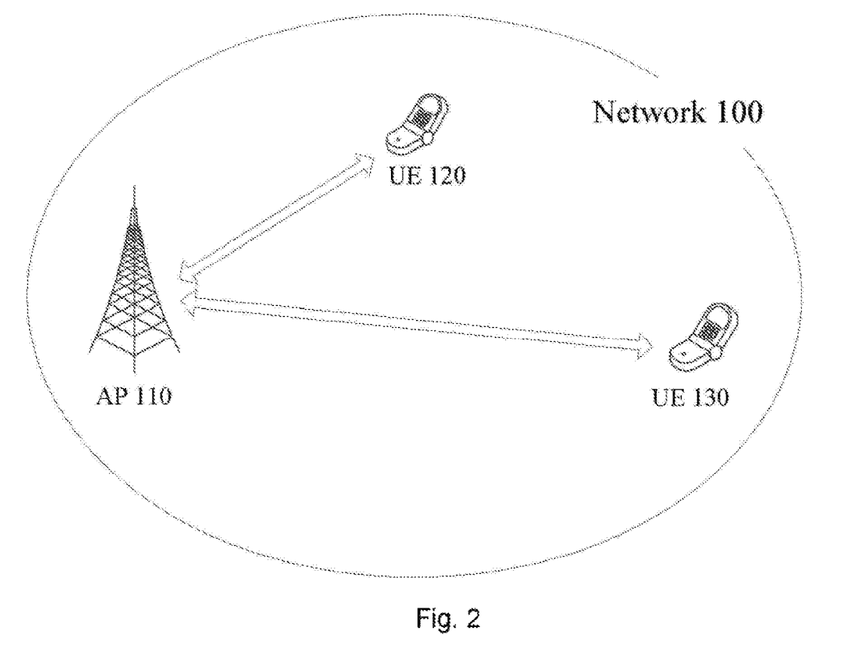
FIG. 2 schematically illustrates an exemplary radio communication network environment that is suitable for implementing the embodiments of the present disclosure.

FIG. 2 schematically illustrates an exemplary radio communication network environment 100 that is suitable for implementing the embodiments of the present disclosure. As shown, the radio communication network 100 includes an AP 110 which serves a UE 120 and a UE 130. As indicated, the UE 130 has a longer distance from the AP 110 than the UE 120.

The UE may be any device intended for accessing services via an access network and configured to communicate over the access network. For instance, the UE may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The UE may be a portable, pocket-storable, hand-held, computer-comprised, machine-type communication device, or vehicle-mounted mobile device, enabled to communicate voice and/or data, via a wireless or wireline connection. Herein, the UE can be used interchangeably with the terminal device.

For purpose of illustration, only one AP and two UEs are shown. It should be appreciated that the AP can serve one or more UEs and the network 100 can include one or more APs as desired.

Figure 3:
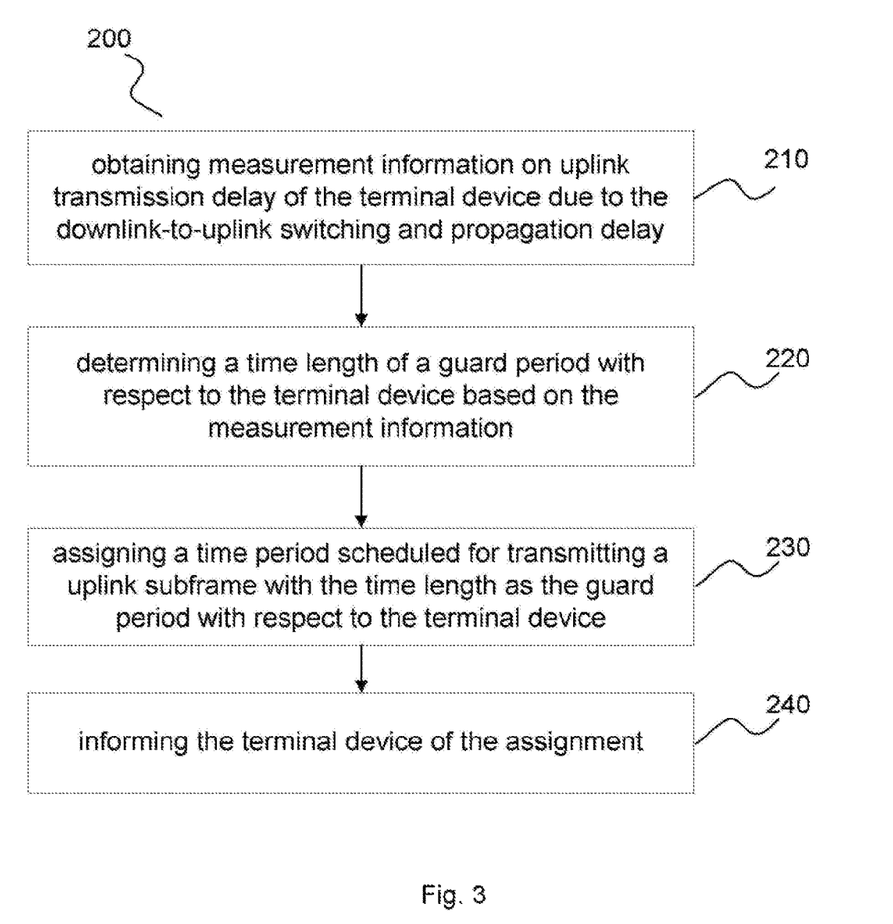
FIG. 3 schematically illustrates a flowchart of a method of determining guard period for downlink-to-uplink switching in accordance with an embodiment.

FIG. 3 schematically illustrates a flowchart of a method 200 in an AP of determining guard period for downlink-to-uplink switching in accordance with an embodiment. In the embodiment, the AP 110 prepares to switch from the downlink transmission to the uplink transmission. Accordingly, the AP 110 will determine the guard period with respect to the UEs, i.e. UE 120 and UE 130, for the switching. Now the process of the embodiment will be described in detail with reference to the FIG. 3 and FIG. 1.

In block 210, the AP 110 obtains measurement information on uplink transmission delay of the terminal device, e.g. UE 120, due to the downlink-to-uplink switching and propagation delay.

Figure 4:
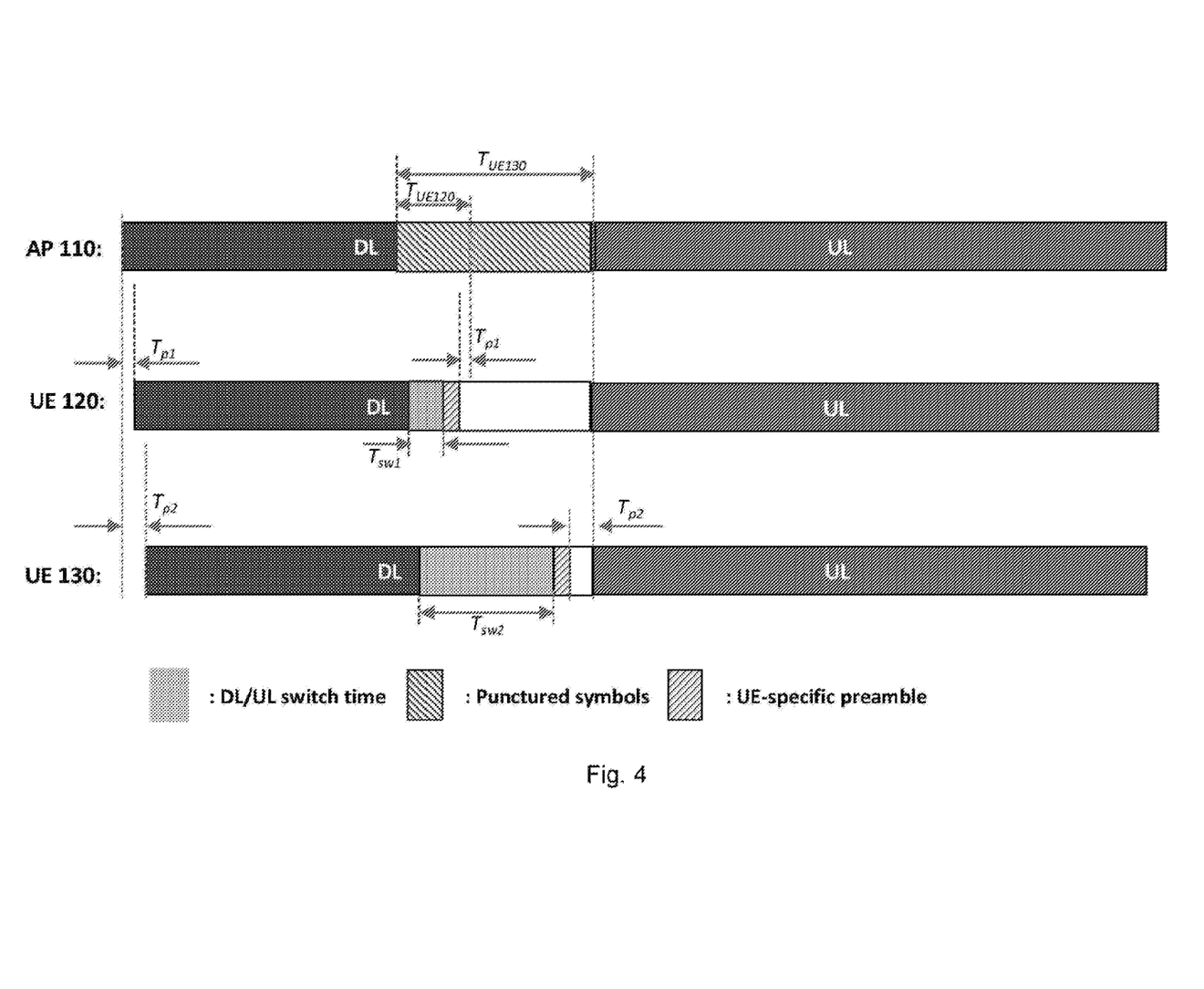
FIG. 4 schematically illustrates determining the time length of guard periods with respect to the individual UEs in accordance with an embodiment.

In an embodiment, the AP 110 may transmit a measurement signaling to the UE 120 and requests the UE 120 perform a switching from the downlink transmission to the uplink transmission and then respond. After receiving the response from the UE 120, the AP 110 may measure the uplink transmission delay of the UE due to the downlink-to-uplink switching and propagation delay, for instance, by comparing the reception time of the response to the transmission time of the measurement signaling. It should be appreciated that this measurement process can be performed periodically or on a specific request. As illustrated in FIG. 4, the uplink transmission delay of the UE 120, i.e. $T_{UE120}$, due to the downlink-to-uplink switching and propagation delay can be calculated by the equation below:

$$T_{UE120} = 2 \times T_{p1} + T_{sw1} + T_{seq} \quad (1)$$

where $T_{p1}$ is the propagation delay from the UE 120 to the AP 110, $T_{sw1}$ is the switch time on which the UE 120 spends switching from the downlink transmission to the uplink transmission, and $T_{seq}$ is a fixed duration for transmitting a UE specific sequence.

In another embodiment, the AP 110 has measured the uplink transmission delay of the UE 120 due to the downlink-to-uplink switching and propagation delay shortly before. In this case, the AP 110 doesn't need to measure such uplink transmission delay again and directly take the historical uplink transmission delay as the current uplink transmission delay with the assumption that the displacement of the UE 120 is not large after the measurement.

It should be appreciated that the above obtaining measurement information on uplink transmission delay of the terminal device is described by way of example, and other suitable ways of obtaining the measurement information can be applied to the present disclosure.

In block 220, the AP 110 determines a time length of a guard period with respect to the terminal device such as UE 120 based on the measurement information on the uplink transmission delay of the terminal device.

In an embodiment, the AP 110 can calculate an integral number of symbol durations based on the measurement information of the uplink transmission delay of the UE 120, and determine the time length of the guard period with respect to the UE 120 to be equal to a duration of the integral number of symbol durations. For example, the integral number of symbols, $N_{symb}$, can be calculated by the equation below:

$$N_{symb} = \left\lceil \frac{T_{UE}}{T_{symb}} \right\rceil \quad (2)$$

where $T_{UE}$ is the uplink transmission delay of the UE 120, and $T_{symb}$ is the time duration per symbol. As such, the time length of the guard period with respect to the UE 120 is determined to be equal to $N_{symb} \times T_{symb}$. Alternatively, the time length of the guard period with respect to the UE 120 can be determined to be larger than $N_{symb} \times T_{symb}$ such as $(A+N_{symb}) \times T_{symb}$, where A is a predetermined positive integer.

Figure 5:
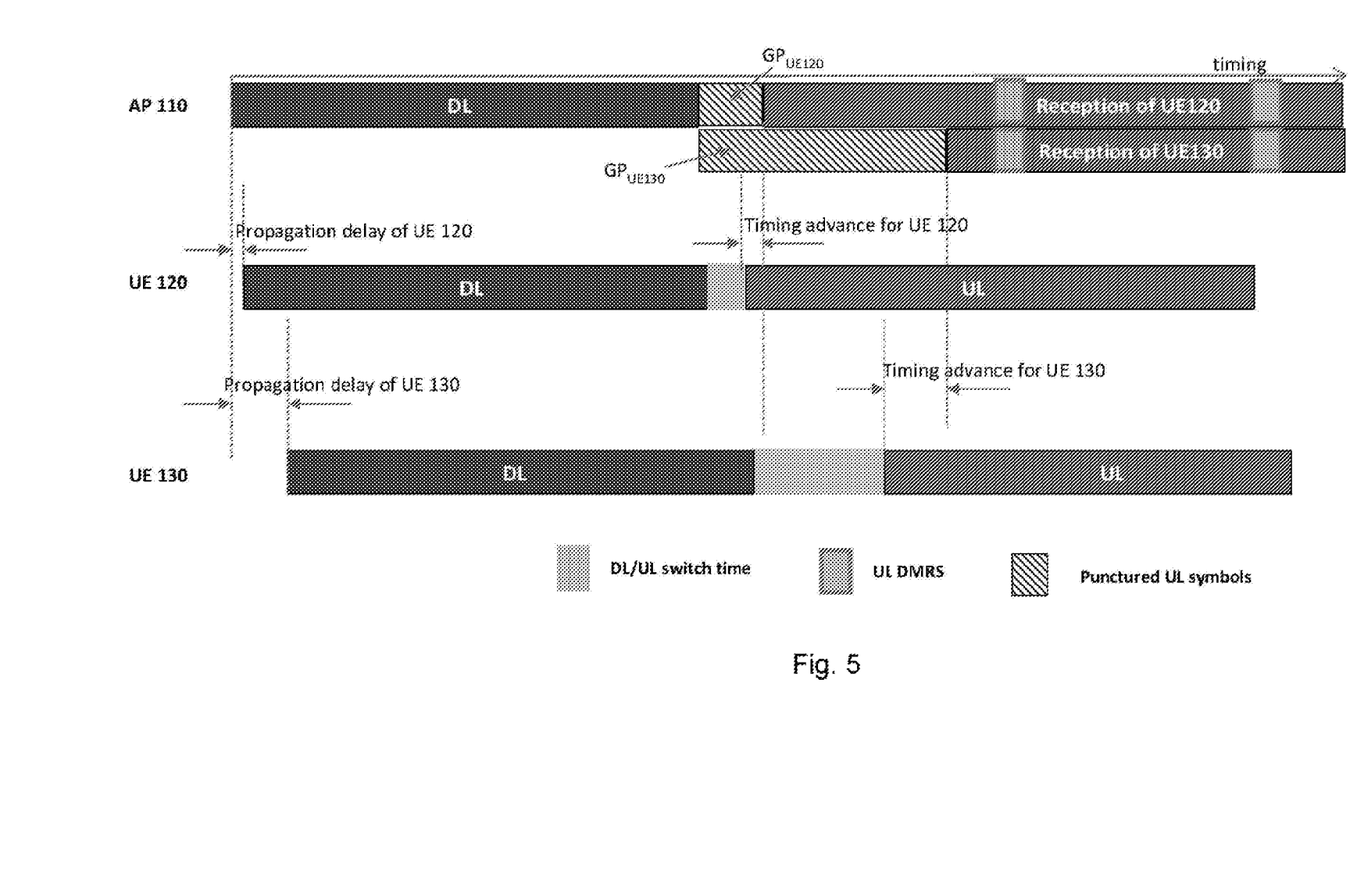
FIG. 5 schematically illustrates the determined guard periods with respect to the individual UEs in accordance with an embodiment.

In block 230, the AP 110 assigns a time period scheduled for transmitting an uplink subframe with the time length, determined in block 220, as the guard period with respect to the terminal device. In particular, in TDD system, downlink subframes and uplink subframes are transmitted in the same frequency spectrum but at different time slots. For example, a time slot is scheduled for the downlink transmission, and then a next time slot are scheduled for the uplink transmission. Between the downlink transmission and the uplink transmission, the AP 110 needs assign a time period as the guard period for the downlink-to-uplink switching. In the embodiment as illustrated in FIG. 5, the time period $GP_{UE120}$ is assigned by the AP 110 at the beginning of the time slot for transmitting the uplink subframes as the guard period with respect to the UE 120.

In block 240, the AP 110 informs the terminal device of the assignment. Specifically, the AP 110 can transmit a signaling to the UE 120 to inform the UE 120 of the assignment. As such, the UE 120 can adjust the duration of its first uplink subframe. For example, the duration of its first uplink subframe is 1 ms by default. Since the first 0.1 ms of the 1 ms is assigned by the AP 110 as the guard period with respect to the UE 120, the UE 120 will determine to transmit its first uplink subframe with the duration of 0.9 ms instead of 1 ms.

In the same way, the AP 110 can assign the time period $GP_{UE130}$ at the beginning of the time slot scheduled for transmitting the uplink subframes as the guard period with respect to the UE 130.

As indicated, the UE 120 and the UE 130 served by the AP 110 are assigned different guard periods instead of the same guard period as does in the prior art. In particular, since the UE 120 has a higher performance than the UE 130, therefore its downlink-to-uplink switching time is less than that of the UE 130. Meanwhile, the UE 120 is closer to the AP 110 than the UE 130, thus the propagation delay of the UE 120 is less than that of the UE 130. As such, the guard period of the UE 120 is shorter than that of the UE 130. By contrast, in the prior art solution, the guard period with respect to the UE 120 has the same time length of the guard period with respect to the UE 130. As can be seen, in the embodiments in the present disclosure, the assigned guard period will occupy less spectrum resources, and this thus more spectrum resources can be reserved for payload transmission. Consequently, the AP 110 can serve multiple kinds of terminal devices with different performances including both high-end terminal and low-end terminal and cover a wide serving area without sacrificing the spectrum efficiency significantly.

In the embodiment above, the AP 110 needs to determine the guard periods with respect to the UEs respectively. Since the plurality of UEs are assigned with different guard periods, the AP 110 need to assign and then inform the UEs of the corresponding guard periods individually. This will cause to consume more processing resources in the AP 110 especially when the AP 110 is serving a large number of UEs. In order to make a tradeoff between the spectrum efficiency and processing resources consumption, it is advantageous that, when the disparities among measurement information on uplink transmission delays of the UEs are small, the AP determines a consistent guard period for the UEs, otherwise, the AP determines the guard periods with respect to the UEs respectively. The process will be described with reference to FIG. 6.

Figure 6:
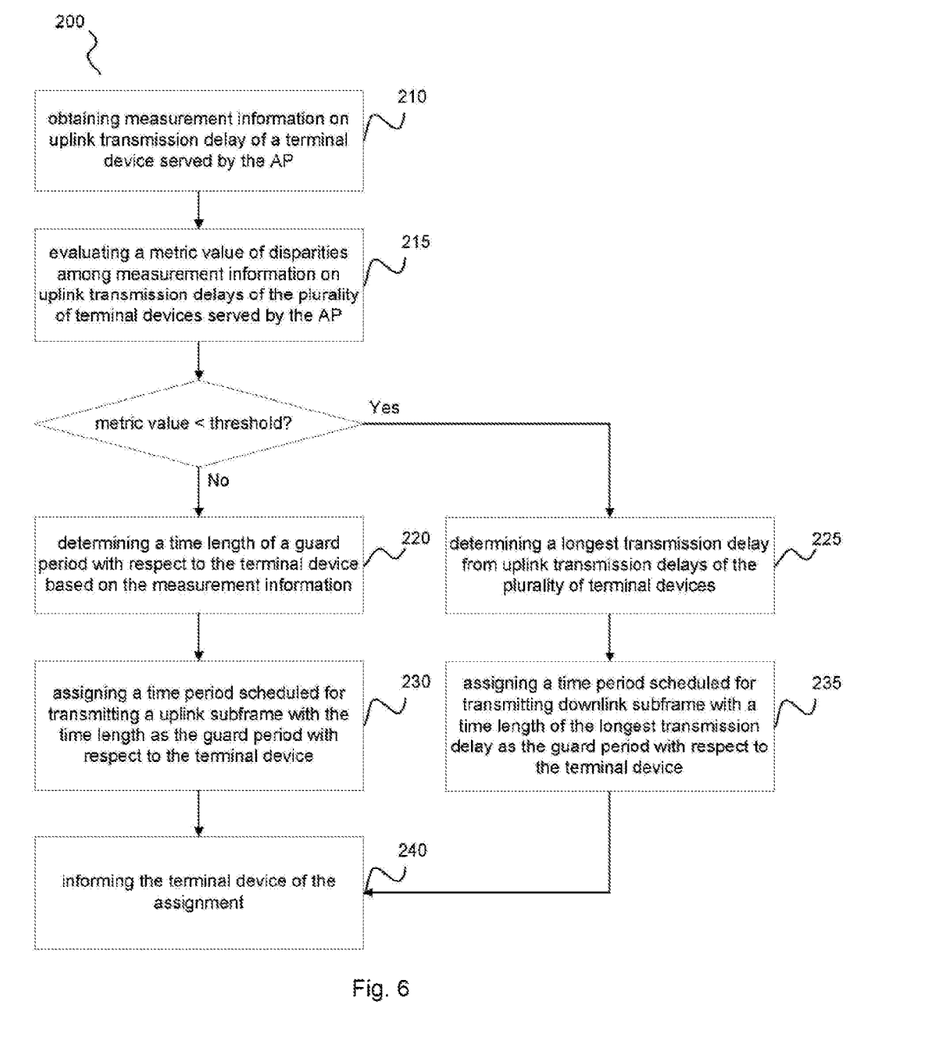
FIG. 6 schematically illustrates a flowchart of a method of determining guard period for downlink-to-uplink switching in accordance with another embodiment.

The AP 110 firstly obtains measurement information on uplink transmission delay of the UEs, i.e. UE 120 and UE 130, served by the AP in block 210 as described above.

In block 220, the AP 110 evaluates a metric value of disparities among measurement information on uplink transmission delays of the UEs.

In an embodiment, the AP 110 can simply determine the metric value by comparing the uplink transmission delays of the UEs. For example, the uplink transmission delay of the UE 120 is $T_{UE120}$, and the uplink transmission delay of the UE 130 is $T_{UE130}$. As such, the AP 110 can calculate the difference value of the $T_{UE120}$ and $T_{UE130}$ as the metric value.

In another embodiment, when the AP 110 is serving a large number of terminal devices, it can evaluate the metric value of disparities among measurement information on uplink transmission delays of the terminal devices by checking the distribution of the uplink transmission delays of the terminal devices. The distribution can be indicated by the squared standard variance of the measurement values on uplink transmission delays of the terminal devices. Specifically, the metric value $\delta^2_{delay}$ can be calculated by the equation below:

$$\delta^2_{delay} = \frac{\sum_{k=0}^{K-1}(T_{TE_k} - E\{T_{TE_k}\})^2}{K}, \quad (3)$$

where K is the number of the plurality of terminal devices, $T_{TE_k}$ is the time length of the uplink transmission delay of the $k^{th}$ terminal device and $E\{T_{TE_k}\}$ is the average time length of the uplink transmission delays of the plurality of terminal devices.

If the evaluated metric value is larger than or equal to a threshold, it means that there is a larger disparity on the switch time plus the propagation time among the terminal devices. In this case, the AP 110 can determine the guard periods with respect to the terminal devices respectively. Specifically, for each of the terminal devices served by the AP 110, the AP 110 determines a time length of a guard period with respect to the terminal device based on the measurement information on the uplink transmission delay of the terminal device in block 220, and then assign a time period scheduled for transmitting a uplink subframe with the time length as the guard period with respect to the terminal device in block 230, as described above.

Otherwise, if the evaluated metric value is less than the threshold, the AP 110 will determine a longest transmission delay from uplink transmission delays of the plurality of terminal devices in block 225 and assign a time period scheduled for transmitting downlink subframe with a time length of the longest transmission delay as the guard period with respect to the terminal device in block 235. For example, the uplink transmission delay of the UE 120 is $T_{UE120}$, and the uplink transmission delay of the UE 130 is $T_{UE130}$. Since $T_{UE130}$ is larger than $T_{UE120}$, the AP 110 will assign a time period scheduled for transmitting downlink subframe with a time length of $T_{UE130}$ as the guard period with respect to both the UE 120 and the UE 130.

Alternatively or additionally, after determining the guard period with respect to the terminal device, the AP can adjust a timing advance for the terminal device to start transmitting an uplink subframe to the serving AP within the guard period, such that reference symbols in the uplink subframe temporally align with reference symbols in uplink subframes transmitted from other terminal devices at the time that the uplink subframe and the uplink subframes transmitted from the other terminal devices are received at the AP.

Specifically, in order to ensure demodulation performance of the uplink subframes transmitted from the plurality of served terminal devices at the AP side, it is desirable that these uplink subframes are temporally aligned when arriving at the AP. In other words, these uplink subframes from different terminal devices arrives at the AP at the same time as shown in FIG. 1. However, in the embodiment of the present disclosure, the terminal devices are assigned different guard periods, which causes that the uplink subframes from different terminal devices can not arrive at the AP at the same time. As illustrated in FIG. 5, the uplink subframe transmitted from the UE 120 arrives at the AP 110 earlier than the uplink subframe transmitted from the UE 130.

In this case, the AP 110 may pursue that the reference symbols, e.g. the uplink demodulation reference symbols (DMRSs), set in the uplink subframes to be temporally align when the uplink subframes arrive at the AP. As known, the DMRS can assist the AP to align the uplink subframes so as to demodulate the uplink subframes easily. As illustrated in FIG. 5, through adjusting the timing advance for the UEs to start uplink transmission within the respective guard period, the AP 110 accomplish that the DMRSs in the uplink subframes transmitted from different UEs are temporally aligned when the uplink subframes arrive at the AP.

Figure 7:
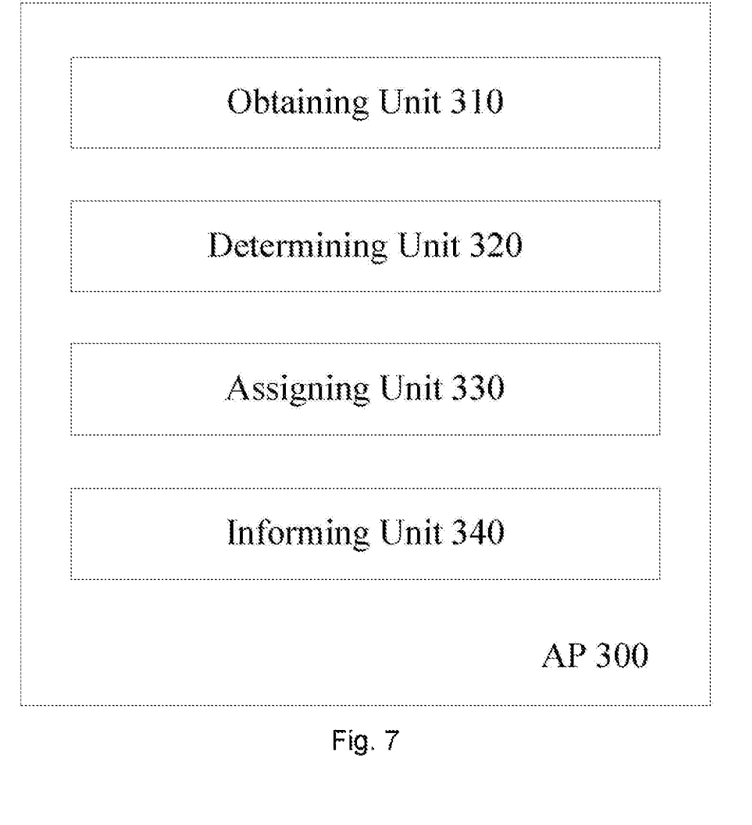
FIG. 7 is a block diagram of an AP configured to determine guard period for downlink-to-uplink switching in accordance with an embodiment.

FIG. 7 is a block diagram of an AP 300 configured to determine guard period for downlink-to-uplink switching in accordance with an embodiment. The AP 300 comprises an obtaining unit 310, a determining unit 320, an assignment unit 330 and an informing unit 340. Now the individual units will be described with reference to the FIG. 7.

The obtaining unit 310 of the AP 300 obtains measurement information on uplink transmission delay of the terminal device, served by the AP, due to the downlink-to-uplink switching and propagation delay.

In an embodiment, the obtaining unit 310 may transmit a measurement signaling to the terminal device at the end of the last downlink subframe transmission and requests the terminal device respond after finishing the switching from the downlink transmission to the uplink transmission. After receiving the response from the terminal device, the obtaining unit 310 may measure the uplink transmission delay of the terminal device due to the downlink-to-uplink switching and propagation delay by comparing the reception time of the response to the transmission time of the measurement signaling.

In another embodiment, the obtaining unit 310 of the AP 300 has measured the uplink transmission delay of the terminal device due to the downlink-to-uplink switching and propagation delay shortly before. In this case, the obtaining unit 310 doesn't need to measure such uplink transmission delay again and directly take the historical uplink transmission delay as the current uplink transmission delay with the assumption that the displacement of the terminal device is not large after the measurement.

The determining unit 320 of the AP 300 determines a time length of a guard period with respect to the terminal device based on the measurement information on the uplink transmission delay of the terminal device.

In one embodiment, the determining unit 320 can directly determine the time length of the uplink transmission delay of the terminal device as the time length of the guard period with respect to the terminal device.

In another embodiment, the determining unit 320 can calculate an integral number of symbol durations based on the measurement information of the uplink transmission delay of the terminal device, and determine the time length of the guard period with respect to the terminal device to be equal to a duration of the integral number of symbol durations. For example, the integral number of symbols, $N_{symb}$, can be calculated by the equation (2) as described above. As such, the time length of the guard period with respect to the terminal device is determined to be equal to $N_{symb} \times T_{symb}$, where $T_{symb}$ is the time duration per symbol. Alternatively, the time length of the guard period with respect to the terminal device can be determined to be larger than $N_{symb} \times T_{symb}$ such as $(A+N_{symb}) \times T_{symb}$, where A is a predetermined positive integer.

The assignment unit 330 of the AP 300 assigns a time period scheduled for transmitting a uplink subframe with the time length, determined by the determining unit 320, as the guard period with respect to the terminal device.

The informing unit 340 of the AP 300 informs the terminal device of the assignment. Specifically, the informing unit 340 can transmit a signaling to the terminal device to inform the terminal device of the assignment. As such, the terminal device can adjust the time length of its first uplink subframe.

In the similar way, the AP 300 can determine the guard periods with respect to other terminal devices served by the AP 300.

Through puncturing the symbols on the uplink subframes, instead of downlink subframe, to reserve the corresponding time slots as the guard period for DL-to-UL switching, the AP is enabled to set different guard periods for the terminal devices served by the AP respectively. In particular, a guard period with respect to a terminal device is determined based on the switch time and propagation delay of this terminal device without considering the switch time and propagation delays of other terminal devices. In this way, the AP can serve multiple kinds of terminal devices with different performances including both high-end terminal and low-end terminal and cover a wide serving area without sacrificing the spectrum efficiency significantly.

Figure 8:
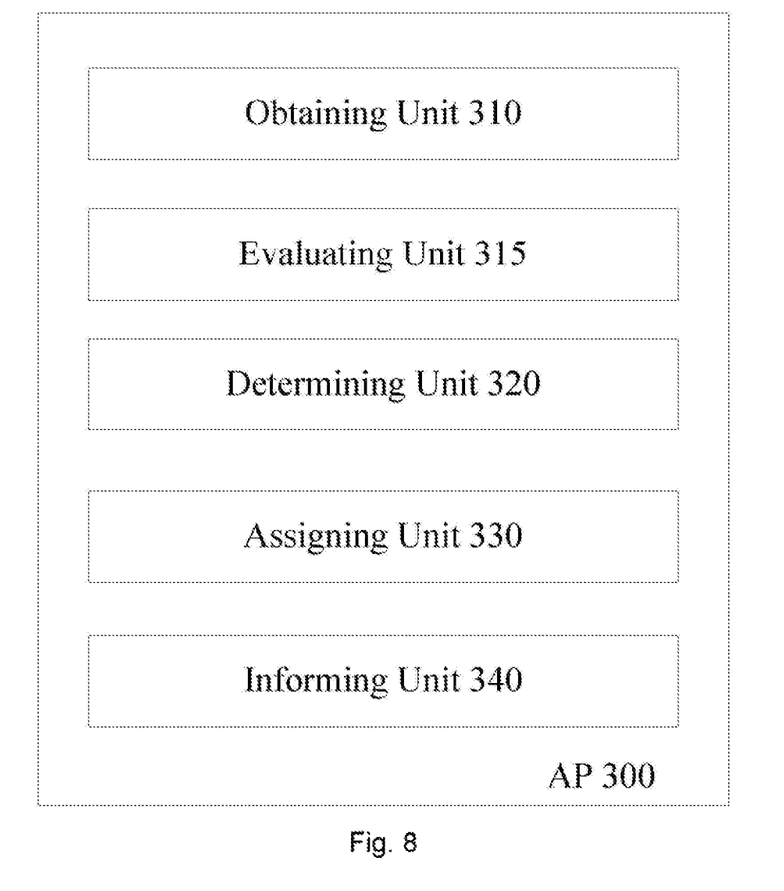
FIG. 8 is a block diagram of an AP configured to determine guard period for downlink-to-uplink switching in accordance with an embodiment.

In the embodiment above, the AP 300 needs to determine the guard periods with respect to the terminal devices respectively. Since the plurality of terminal devices are assigned with different guard periods, the AP 300 need to assign and then inform the terminal devices of the corresponding guard periods individually. This will cause to consume more processing resources in the AP 300 especially when the AP 110 is serving a large number of terminal devices. In order to make a tradeoff between the spectrum efficiency and processing resources consumption, it is advantageous that, when the disparities among measurement information on uplink transmission delays of the terminal devices are small, the AP determines a consistent guard period for the terminal devices, otherwise, the AP determines the guard periods with respect to the terminal devices respectively. For this purpose, the AP 300 further comprises an evaluating unit 315 as illustrated in FIG. 8.

Specifically, the obtaining unit 310 obtains measurement information on uplink transmission delay of the terminal devices served by the AP as described above.

The evaluating unit 315 evaluates a metric value of disparities among measurement information on uplink transmission delays of the terminal devices.

In an embodiment, the evaluating unit 315 can simply determine the metric value of disparities by comparing the uplink transmission delays of the terminal devices.

In another embodiment, when evaluating unit 315 is serving a large number of terminal devices, it can evaluate the metric value of disparities among measurement information on uplink transmission delays of the terminal devices by checking the distribution of the uplink transmission delays of the terminal devices. The distribution can be indicated by the squared standard variance of the measurement values on uplink transmission delays of the terminal devices. Specifically, the metric value can be calculated by the equation (3) as described above.

If the evaluated metric value is larger than or equal to a threshold, it means that there is a larger disparity on the switch time plus the propagation time among the terminal devices. In this case, the AP 300 can determine the guard periods with respect to the terminal devices respectively. Specifically, for each of the terminal devices served by the AP 300, the determining unit 320 determines a time length of a guard period with respect to the terminal device based on the measurement information on the uplink transmission delay of the terminal device, and then the assigning unit 330 assigns a time period scheduled for transmitting a uplink subframe with the time length as the guard period with respect to the terminal device.

Otherwise, if the evaluated metric value is less than the threshold, the AP 300 will determine a longest transmission delay from uplink transmission delays of the plurality of terminal devices and assign a time period scheduled for transmitting downlink subframe with a time length of the longest transmission delay as the guard period with respect to the terminal device.

Alternatively or additionally, after determining the guard period with respect to the terminal device, the AP 300 can adjust a timing advance for the terminal device to start transmitting an uplink subframe to the AP within the guard period, such that reference symbols in the uplink subframe temporally align with reference symbols in uplink subframes transmitted from other terminal devices at the time that the uplink subframe and the uplink subframes transmitted from the other terminal devices are received at the AP.

Specifically, in order to ensure demodulation performance of the uplink subframes transmitted from the plurality of served terminal devices at the AP side, it is desirable that these uplink subframes are temporally aligned when arriving at the AP. In other words, these uplink subframes from different terminal devices arrives at the AP at the same time as shown in FIG. 1. However, in the embodiment of the present disclosure, the terminal devices are assigned different guard periods, which causes that the uplink subframes from different terminal devices can not arrive at the AP at the same time.

In this case, the AP 300 may pursue that the reference symbols, e.g. the uplink demodulation reference symbols (DMRSs), set in the uplink subframes to be temporally align when the uplink subframes arrive at the AP. As known, the DMRS can assist the AP to align the uplink subframes so as to demodulate the uplink subframes easily.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method in an access point (AP) in a time division duplex radio communication network of determining guard periods for downlink-to-uplink switching, comprising:
   for each of a plurality of terminal devices served by the AP:
      obtaining measurement information on uplink transmission delay of the terminal device due to downlink-to-uplink switching and propagation delay;
      determining a time length of a guard period with respect to the terminal device based on the measurement information;
      evaluating a metric value of disparities among the measurement information on uplink transmission delays of the plurality of terminal devices;
      assigning a time period scheduled for transmitting an uplink subframe with the time length as the guard period with respect to the terminal device in response to the metric value being larger than or equal to a threshold; and
      informing the terminal device of the assignment.

2. The method of claim 1, wherein determining the time length of the guard period comprises calculating an integral number of symbol durations based on the measurement information, and determining the time length of the guard period with respect to the terminal device to be equal to a duration of the integral number of symbol durations.

3. The method of claim 1, wherein the method further comprises, in response to the metric value being less than the threshold:

determining a longest transmission delay from uplink transmission delays of the plurality of terminal devices; and assigning a time period scheduled for transmitting a downlink subframe with a time length of the longest transmission delay as the guard period with respect to the terminal device.

4. The method of claim 1, wherein the metric value ($\delta^2_{delay}$) is evaluated by, $$\delta^2_{delay} = \frac{\sum_{k=0}^{K-1}(T_{TE_k} - E\{T_{TE_k}\})^2}{K},$$

where K is the number of the plurality of terminal devices, $T_{TE}$ is the time length of the uplink transmission delay of the $k^{th}$ terminal device and $E\{T_{TE}\}$ is the average time length of the uplink transmission delays of the plurality of terminal devices.

5. The method of claim 1, wherein the method further comprises adjusting a timing advance for the terminal device to start transmitting an uplink subframe to the AP such that reference symbols in the uplink subframe temporally align with reference symbols in uplink subframes transmitted from other terminal devices at the time that the uplink subframe and the uplink subframes transmitted from the other terminal devices are received at the AP.

6. A non-transitory computer readable storage medium which stores instructions which, when run on processing circuitry of an access point (AP), cause the AP to, for each of a plurality of terminal devices served by the AP:
obtain measurement information on uplink transmission delay of the terminal device due to downlink-to-uplink switching and propagation delay;
determine a time length of a guard period with respect to the terminal device based on the measurement information;
evaluate a metric value of disparities among the measurement information on uplink transmission delays of the plurality of terminal devices;
assign a time period scheduled for transmitting an uplink subframe with the time length as the guard period with respect to the terminal device in response to the metric value being larger than or equal to a threshold; and
inform the terminal device of the assignment.

7. An access point (AP) configured to determine guard periods for downlink-to-uplink switching in a time division duplex radio communication network, comprising a processor and a memory, said memory containing instructions executable by said processor whereby said AP is operative to:
obtain measurement information on uplink transmission delay of the terminal device due to downlink-to-uplink switching and propagation delay;
determine a time length of a guard period with respect to the terminal device based on the measurement information;
evaluate a metric value of disparities among the measurement information on uplink transmission delays of the plurality of terminal devices;
assign a time period scheduled for transmitting an uplink subframe with the time length as the guard period with respect to the terminal device in response to the metric value being larger than or equal to a threshold; and
inform the terminal device of the assignment.

8. The AP of claim 7, wherein the instructions executable by said processor cause said AP to:
calculate an integral number of symbol durations based on the measurement information; and
determine the time length of the guard period with respect to the terminal device to be equal to a duration of the integral number of symbol durations.

9. The AP of claim 7, wherein the instructions executable by said processor cause said AP to, in response to the metric value being less than the threshold:
determine a longest transmission delay from uplink transmission delays of the plurality of terminal devices; and
assign a time period scheduled for transmitting downlink subframe with a time length of the longest transmission delay as the guard period with respect to the terminal device.

10. The AP of claim 7, wherein the metric value ($\delta^2_{delay}$) is evaluated by, $$\delta^2_{delay} = \frac{\sum_{k=0}^{K-1}(T_{TE_k} - E\{T_{TE_k}\})^2}{K},$$

where K is the number of the plurality of terminal devices, $T_{TE}$ is the time length of the uplink transmission delay of the $k^{th}$ terminal device and $E\{T_{TE}\}$ is the average time length of the uplink transmission delays of the plurality of terminal devices.

11. The AP of claim 7, wherein the instructions executable by said processor cause said AP to:
adjust a timing advance for the terminal device to start transmitting an uplink subframe to the AP such that reference symbols in the uplink subframe temporally align with reference symbols in uplink subframes transmitted from other terminal devices at the time that the uplink subframe and the uplink subframes transmitted from the other terminal devices are received at the AP.

12. The AP of claim 7, wherein the instructions executable by said processor cause said AP to, in response to the metric value being less than the threshold:
determine a longest transmission delay from uplink transmission delays of the plurality of terminal devices; and
assign a time period scheduled for transmitting downlink subframe with a time length of the longest transmission delay as the guard period with respect to the terminal device.

* * * * *